3,549,694

α-AMINO-p-TOLUENESULFONAMIDE CITRATE
Avery A. Johnson, Jr., and Arthur D. Mason, Jr., San Antonio, and Charles R. Ritchey, Fort Sam Houston, Tex., assignors to the United States of America as represented by the Secretary of the Army
No Drawing. Filed May 15, 1968, Ser. No. 729,427
Int. Cl. C07c 143/00
U.S. Cl. 260—501.21                                          1 Claim

ABSTRACT OF THE DISCLOSURE

The disclosure describes a citric acid salt of homosulfanilamide and its use in the treatment and control of *Pseudomona aeruginosa*, particularly as that bacillus is in burn wounds.

---

The invention described herein may be manufactured and used by or for the Government for governmental purposes without the payment to us of any royalty thereon.

BACKGROUND OF THE INVENTION

(1) Field of the invention

This invention relates to a homosulfanilamide salt for use in an ointment in the treatment and control of burn wound sepsis. More specifically, it relates to a discovery that the citric acid salt is effective against burn wound sepsis and provides a more stable ointment than other homosulfanilamide salts.

(2) Description of the prior art

A number of homosulfanilamide salts have been prepared in the past, as illustrated by U.S. Pat Nos. 2,545,-962; 2,509,191; and 2,493,632. Of these, the streptomycin salt disclosed in Pat No. 2,509,191, has been used to treat and control the bacillus *Pseudomonas aeruginosa* which is one major cause of burn wound sepsis. See, for example, Zinsser, Textbook of Bacteriology, 10th ed., p. 490. More recently, two salts which have been used in the treatment are the hydrochloric acid salt and the acetic acid salt. However, problems have arisen in the use of these prior art salts. Both the toxicity of the homosulfanilamide drug and the acidity of the salt cause drug sensitivity. The prior art salts have been found to be susceptible to deterioration by both light and heat. This deterioration reduces the effectiveness of salves and ointments containing these salts. In tropical areas such as Vietnam, where the salve is needed for the treatment of the wounded soldiers, this defect is a considerable drawback.

SUMMARY OF THE INVENTION

This invention provides a homosulfanilamide salt which has a higher degree of stability and a more neutral pH than heretofore available, and which nevertheless is effective in the treatment and control of *Pseudomonas aeruginosa*, a major cause of burn sepsis. Specifically, we have produced the α-amino-p-toluene-sulfonamide salt of citric acid and have discovered that it not only is effective against burn sepsis, it also has the unexpected properties of greater stability and an exactly neutral pH.

Accordingly, it is an object of this invention to provide a homosulfanilamide salt that is stable to both light and heat and is effective in the treatment and control of *Pseudomonas aeruginosa*.

It is a further object to provide a salt of the above character which also has a lower toxicity and a more neutral pH.

Other objects and advantages will become apparent upon reference to the following detailed discussion.

DESCRIPTION OF THE PREFERRED EMBODIMENT

The α-amino-p-toluenesulfonamide salt of citric acid is prepared by the conventional method of reaction of the acid and the base. As an example, forty grams of α-amino-p-toluenesulfonamide were slowly added to 12.5 grams of citric acid dissolved in 125 ml. of water maintained at about 50° C. Then, 375 ml. of absolute ethanol was added slowly with stirring while maintaining the temperature at 50° C. After chilling the solution in an ice water bath, the crystals that precipitated were collected in a cold Buchner funnel and washed with 50 ml. of cold absolute ethanol. The product had an uncorrected melting point of 109–111° C. and a solubility of 64.26 grams in 100 ml. of water at 22° C. The pH was found to be 7.00 as opposed to 4.39 for the hydrochloric acid salt, and 6.64 for the acetic acid salt.

The salt was then added to an ointment base for use as a chemotherapeutic salve. One satisfactory base is the standard Ointment Base FSN 6101–131–6420. There is no reason why other ointment bases would not be satisfactory.

To test for activity, equivalent concentrations of the hydrochloric acid salt and the citric acid salt were prepared with an ointment base as described above. In order to provide the same amount of homosulfanilamide in each (10%), the differing molecular weights of the two salts required a ratio of 1.7 grams of the citric acid salt to 1 gram of hydrochloric acid salt in the same amount of ointment base. This meant that the actual concentration of the citric acid salt was 20.4% as opposed to a 12% actual concentration of the hydrochloric acid salt. The salve thus prepared was applied to the burned areas of rats which had been clipped and scalded for 10 seconds over 20% of the body surface and which had been seeded within 60 minutes after the scalding with two different strains of *Pseudomonas aeruginosa*. The results are indicated in Table 1.

TABLE 1.—THERAPEUTIC ACTIVITY

| Compound | Strain of Ps. aeruginosa | Death/total |
|---|---|---|
| Citrate | 12-4-4 | 2/11 |
| HCl | 12-4-4 | 0/15 |
| Control | 12-4-4 | 18/20 |
| Citrate | 8-28-3 | 2/16 |
| HCl | 8-28-3 | 0/11 |
| Control | 8-28-3 | 24/24 |

To test for stability, the same concentrations as tested for activity were placed in two sets of Petri dishes, each set having a control with an ointment base only. In addition, a dish containing a salve mixture of the acetic acid salt giving a 10% homosulfanilamide concentration was added to each set. One set was placed in a 37° C. oven for about 12 hours while the other set was placed in direct sunlight filtered by a conventional window from 4 to 24 hours. Each set was observed visually for yellowing, a sign that the salt was deteriorating. At the end of the tests, the two sets gave almost identical results: the citric acid salt was slightly less yellowed than the hydrochloric salt, considerably less yellowed than the acetate salt, and about the same as the control. In other words, the citric salt, unlike the others, experienced practically no determioration.

To test for toxicity, an aqueous solution of the citric acid and the hydrochloric acid salts was prepared for oral administration to rats. The amount administered was adjusted so as to represent the indicated milligrams of homosulfanilamide rather than the salt. Table 2 illustrates the number of deaths per the number of experimental animals in that group under control conditions (no burns). Only the hydrochloric acid and the citric acid salts were tested.

TABLE 2.—CONTROL

| Oral dose (mg.)/10 gm. body wt. | 150 | 135 | 125 | 115 | 100 | 85 | 70 |
|---|---|---|---|---|---|---|---|
| HCl | 4/5 | 2/2 | 7/8 | 3/5 | 3/10 | 0/2 | 0/2 |
| Citrate | 4/5 | | 0/5 | 0/2 | | 0/2 | 0/2 |

Table 3 illustrates again the number of deaths per number of rats, but this time each rat was subjected to a 20% total body burn prior to the administration of the dose. The acetic acid salt was also tested.

TABLE 3.—20% BURN

| Oral dose (mg.)/10 gm. body wt. | 150 | 135 | 125 | 115 | 100 | 85 | 70 |
|---|---|---|---|---|---|---|---|
| HCl | 10/10 | 5/5 | 10/10 | 11/15 | 10/15 | 2/10 | 1/10 |
| Citrate | 4/5 | | 9/10 | 1/10 | 0/10 | 3/10 | 0/10 |
| Acetate | 5/5 | | 5/5 | 9/10 | 7/10 | 1/5 | 0/5 |

As is apparent from the two tables, the $LD_{50}$ for the hydrochloric acid salt is 100–115 milligrams/10 grams body weight without burns, and 85–100 in the case of a 20% total body burn. In contrast, the $LD_{50}$ for the citric acid salt is 125–150 milligrams/10 grams without burns, and 115–125 milligrams/10 grams in the case of a 20% burn. The acetic acid salt has the same toxicity in the case of a 20% burn as does the hydrochloric acid salt. Accordingly, the dangers of drug sensitivity and the possibilities of side reactions are reduced when the citric acid salt is used.

In view of the foregoing tests, it is apparent that the citric acid salt, when mixed with an ointment, can be applied to burn wounds, particularly when the amount of salt used (20.4%) provides a 10% concentration of the homosulfanilamide.

While the invention has been described in connection with a preferred embodiment, it will be understood that we do not intend to limit the invention to that described. Rather, we intend to cover all alternatives, modifications, and equivalents as may be included within the spirit and scope of the invention as defined by the following claim.

We claim:
1. The α-amino-p-toluenesulfonamide salt of citric acid.

References Cited

FOREIGN PATENTS 604,901    7/1948    Great Britain ____ 260—501.21

OTHER REFERENCES

T. W. Skulan et al., Chemical Abstracts vol. 66, p. 2598, No. 27589Y (1967).

LEON ZITVER, Primary Examiner

M. W. GLYNN, Assistant Examiner

U.S. Cl. X.R.

424—321